Feb. 15, 1927.
H. C. PIERLE
MACHINE TOOL
Filed July 18, 1924
1,617,606
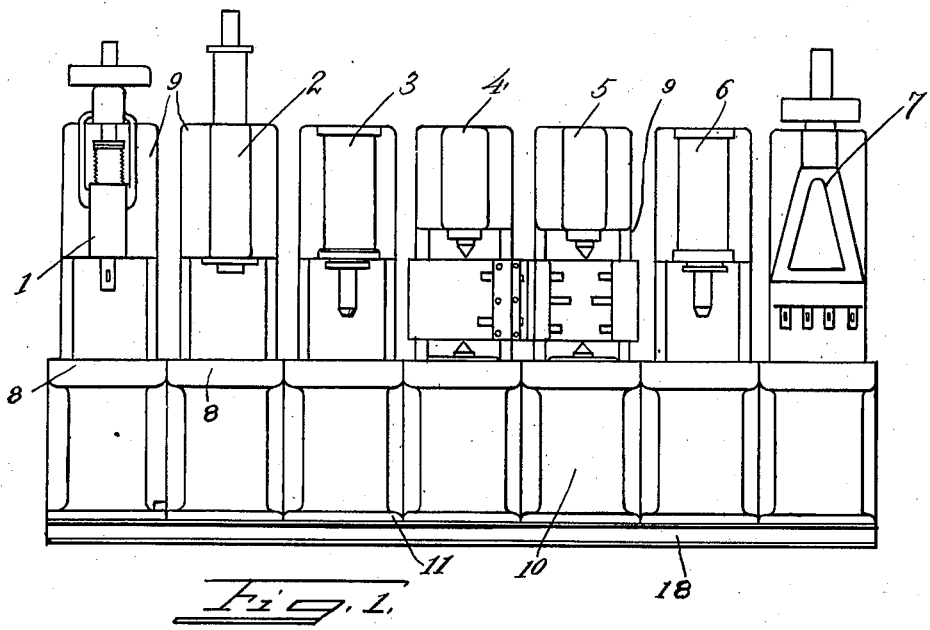
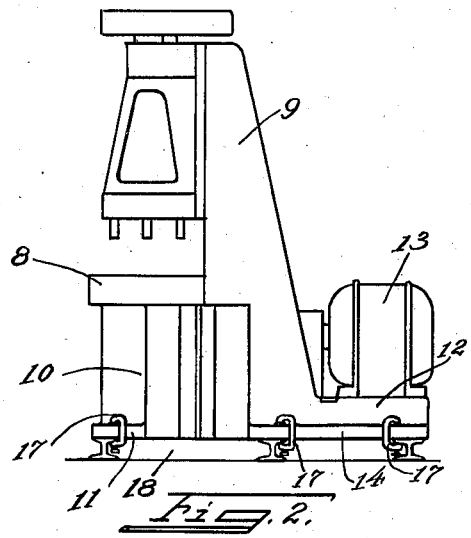
INVENTOR:
Henry C. Pierle
BY
ATTORNEYS.

Patented Feb. 15, 1927.

1,617,606

UNITED STATES PATENT OFFICE.

HENRY C. PIERLE, OF CINCINNATI, OHIO, ASSIGNOR TO THE R. K. LE BLOND MACHINE TOOL COMPANY, OF CINCINNATI, OHIO, A CORPORATION OF DELAWARE.

MACHINE TOOL.

Application filed July 18, 1924. Serial No. 726,724.

My invention relates to machine tools and more particularly to tools having a series of elements for performing selected work on a piece, said elements arranged in gang, and with the framework of the tool arranged in a sectional form, so that the elements may be shifted about as may suit a particular job.

The only tools for progressive treatment of a metal piece of which I have knowledge, are circular indexing automatics, and in these there is a degree of inflexibility in arrangements for the kind of work done by the several spindles, the number of spindles is a fixed quantity, and the power elements come into play to drive each spindle whether it is being used or not. I am not aware of any machine tool of gang type in which the elements in gang are selectively arranged for performing any desired kind of work, such as drilling, lathe work, milling, broaching, taping and the like, and in which the tool framework is sectional, and so arranged that the working elements may be interchangeably and demountably secured together.

It is an object of my invention to provide a compound tool with interchangeable parts, which can make a finished piece from the blanks, and deliver it alongside the main conveyor in an automobile factory, the compound tool being of a size and shape to occupy a "bay" alongside the main conveyor.

It is my object to provide a compound progressive tool, which can be assembled in little time to cover various operations on a piece, and in which additional units can be added to suit the particular job doubling up on one particular operation where it is a slow one. It is my object to provide for easy disassembling of the parts of the tool, when the particular work is discontinued, and for easy replacement of a broken element by a spare element, without loss of time or shut down. It is my object to provide a compound tool by means of which operations, such as drilling, turning, facing, broaching, reaming, and the like, can be done on the same machine at the same time, thereby cutting down the number of operators on the job. Storage between operations is eliminated and trucking from the rough to the finished piece is no longer required. With even more saving in floor space, due to present manufacturing arrangements, my machine will do much more work than the present circular indexing automatics, and more varied work, since idle stations are almost always present during work on circular automatics, which have a fixed number of spindles, which are put into operation whether they are used or not.

I accomplish my object above recited, by that certain construction and arrangement of parts to be hereinafter more specifically pointed out and claimed.

In the drawing:

Figure 1 is a side elevation, in the nature of a diagram of my novel device.

Figure 2 is an end, or side elevation of one of the units.

Figure 3 is a detail section showing one form of aligning means for use with my invention.

In the drawings, which illustrate merely one embodiment of my invention, 1 is a drill press, 2 is a broach, 3 is an arbor press, 4 a turning lathe, 5 a facing lathe, 6 another arbor press, and 7 a multiple drill.

In each instance the framework of the machine, whatever be its type, comprises a table 8 for the work to be passed along from one element to the other, a standard 9, which is set vertically whether in a lathe and arbor press or a drill. The standards below the table as at 10, have flanges 11, which are used for securing the elements in place on the bed. There will be a rearward projection for mounting the driving means, in this instance the rearward projection being illustrative as part of the vertical standard with a motor base 12 on which each device may have its motor 13. The rearward projections will also have flanges 14, for securing down the elements to the base.

The tables will be formed, or some portion of the forward projections of the standards, that support the table will be formed, so as to provide an alignment to positively bring all units into proper relative position. This, while a preferential feature, may have various forms. In the form shown the left hand of each table will have a V-shaped notch, 15, and the right hand side of each table will have a V-shaped projection 16.

I have indicated clamps 17 for securing the bases of the elements of the tool to a bed consisting of three rails or I-beams 18, arranged on a suitable foundation. Other forms of mounting could be provided, of course.

It will be noted that the lathes operate vertically instead of horizontally, and that each table portion and standard present a like cross section, so that any one unit can be lifted out of place and another unit inserted in its place, and further, that the mode of alignment is so arranged, that it comes into full functioning without the necessity of moving the units about, when lifting one out and dropping another into place between alternate ones of the elements.

One operative will take care of a number of operations, if they are part of the same machine.

The tables form, in my preferred form, a level continuation with each other, each table coming into full abutment with the tables of the machines by its side, when the units are in place.

It is this lateral abutment which gives the required stability to the relatively narrow supporting parts of the particular embodiments shown.

In making a gear, with the exact embodiment shown, a blank is first drilled in the first element, it is moved along the table and broached by the next element, and in the third element is fitted with a mandrel in the arbor press. One man can be drilling, broaching and setting in mandrels at the same time. The piece is then moved along to the lathe, where the necessary circular cuts are made, and then to the facing lathe, after which the mandrel is pressed out in the arbor press, and the piece is drilled with its final holes for bolting it in place in a mechanism in the multiple drill.

The space occupied by the machine, is in my practice rectangular and accommodates itself ideally to motor vehicle manufacture, as has been noted.

The various objects recited are easily performed as will be apparent.

Having thus described my invention, what I claim as new and desire to secure by Letters Patent, is:—

1. A machine tool comprising a bed, a series of working units for doing different kinds of work having frameworks of like cross-sectional area, means for attaching the units in a line along the bed so as to form a continuous series of units for work on a single piece, and means for driving said units, said units having tables which are of an equal height, and when the units are set side by side will abut against each other to form a continuous support.

2. A machine tool comprising a bed, a series of working units for doing different kinds of work having frameworks of like cross-sectional area, means for attaching the units in a line along the bed so as to form a continuous series of units for work on a single piece, and means for driving said units, said units having tables which are of an equal height, and when the units are set side by side will abut against each other to form a continuous support, and means on the several units for automatically aligning them with each other.

3. A machine tool comprising a bed, a series of working units for performing a series of operations on a piece, said units having frameworks of like cross sectional area, means for attaching the units in a line along the bed so as to form a continuous series of units for work on a single piece, and means for driving said units, said units having tables which are of equal height, and which will, when the units are set side by side, abut each against another to form a continuous support.

HENRY C. PIERLE.